United States Patent [19]

Quacquarella et al.

[11] Patent Number: 4,801,486

[45] Date of Patent: Jan. 31, 1989

[54] THERMOPLASTIC MULTI-LAYER PACKAGING FILM AND BAGS MADE THEREFROM

[75] Inventors: Cesare Quacquarella, Milan, Italy; Richard S. Williams, Wyton, England

[73] Assignee: W. R. Grace & Co.-Conn., Duncan, S.C.

[21] Appl. No.: 911,936

[22] Filed: Sep. 26, 1986

[51] Int. Cl.$^4$ .................. B32B 27/08; B32B 27/30; B32B 27/32; B29D 7/02

[52] U.S. Cl. .................................. 428/34.9; 428/349; 428/516; 428/518; 428/520; 428/476.3; 428/476.9; 428/35.4; 426/127

[58] Field of Search ............... 428/35, 347, 349, 516, 428/518, 520, 476.3, 476.9

[56] References Cited

U.S. PATENT DOCUMENTS

| | | | |
|---|---|---|---|
| 4,064,296 | 12/1977 | Bornstein et al. | 428/516 X |
| 4,161,562 | 7/1979 | Yoshikawa et al. | |
| 4,239,826 | 12/1980 | Knott, II et al. | 428/516 X |
| 4,281,045 | 7/1981 | Sumi et al. | 428/516 |
| 4,424,243 | 1/1984 | Nishimoto et al. | |
| 4,456,646 | 6/1984 | Nishimoto et al. | |
| 4,457,960 | 7/1984 | Newsome. | |
| 4,469,742 | 9/1984 | Oberle et al. | |
| 4,640,856 | 2/1987 | Ferguson et al. | 428/36 |

FOREIGN PATENT DOCUMENTS 1600250 10/1981 United Kingdom .

Primary Examiner—P. C. Ives
Attorney, Agent, or Firm—John J. Toney; William D. Lee, Jr.; Mark B. Quatt

[57] ABSTRACT

A thermoplastic, multi-layer packaging film is disclosed which comprises at least 5 layers in which one surface layer is a heat sealing layer and one of the internal layers is a barrier layer. The heat sealing surface layer comprises a copolymer of ethylene and an alpha-olefin having 4 to 8 carbon atoms per molecule and said copolymer comprises 90% to 75% ethylene and 10% to 25% alpha-olefin having 4 to 8 carbon molecules and a density of less than 915 kg/m$^2$. The heat sealing layer may also comprise a blend of the aforementioned copolymer with an ethylene/vinyl-acetate copolymer or an ethylene/butyl-acrylate copolymer. The film can be oriented to be heat shrinkable and can be formed into bags by heat sealing portions of the sealing surfaces together. The heat seals have superior cold strength and minimize seal failure when the bags are loaded with relatively heavy products.

5 Claims, No Drawings

THERMOPLASTIC MULTI-LAYER PACKAGING FILM AND BAGS MADE THEREFROM

The invention relates to thermoplastic multi-layer packaging films and bags or pouches made therefrom. In particular this invention relates to films and bags having superior heat shrink and cold seal properties, which give good seal strength even through contamination like grease or blood, and which allow the application of higher shrink temperatures due to their improved seal strength at elevated temperatures.

Shrinkable and heat sealable thermoplastic films are being used in packaging of non-food and food products like meat, cheese, poultry and the like. Many attempts have been made to combine good shrink properties with satisfactory sealability and good seal strength both at room temperature and at higher temperatures but there is still room for improvement.

A laminate film known from U.S. Pat. No. 3,741,253 comprises a core layer of a vinylidene chloride copolymer between a layer of a cross-linked ethylene-vinyl acetate copolymer used as a sealant and an outer layer of ethylene-vinylacetate copolymer which is not cross-linked. The ethylene-vinylacetate copolymer has improved properties over the previously used polyethylene, especially when it has been cross-linked by irradiation.

As disclosed in U.S. Pat. No. 4,064,296 the core layer may also consist of a hydrolized ethylene-vinyl acetate copolymer. It has similar oxygen barrier properties as vinylidene chloride copolymers and offers the advantage that it may be irradiated without discoloration.

Certain advantages have been achieved by using an ionomeric resin as sealing layer. They result in a higher seal strength at elevated temperatures thus allowing higher shrink temperatures. However, their cold seal strength is not fully satisfactory. This latter property is important in modern automated bag packaging processes in which the seals are subjected to substantial stress when the bags are opened and loaded with the article to be packed.

More recently low density linear polyethylenes have become commercially available and have also been proposed for packaging applications. Actually the so called linear low density polyethylenes are copolymers of ethylene and varying amounts of higher $\alpha$-olefins with e.g. 5 to 10 carbon atoms per molecule (U.S. Pat. No. 4,076,698) or 3 to 8 carbon atoms per molecule (published European patent application No. 120503). Depending on their density these materials are referred to as linear low density polyethylene (LLDPE) or very low density polyethylene (VLDPE), the separation line being at a density of about 0.910 g/cm$^3$. Some properties of VLDPE have been described in Plastics Technology, September 1984, page 113 and October 1984, page 13 as well as in a company brochure published in February 1984 by DSM in the Netherlands and entitled "Stamilex PE". Their properties are said to be a unique combination between those of standard polyethylene and polyolefinic rubbers. Their sealability and their compatibility with other polymers has been mentioned.

It is an object of the present invention to provide a multi-layer laminated packaging film and bags made therefrom which have improved shrink characteristics over the materials used in the past. This means that at a given temperature the shrink in percent (the mean between the shrink in the longitudinal and transversal direction) should be higher and the tolerated maximum shrink temperature should also be higher. The maximum shrink temperature is dependent on the seal strength at elevated temperatures.

It is a further object of this invention to provide a packaging material with improved cold seal strength and thereby a reduced risk of breakages when bags made of the film material are utilized in automated loading processes.

It is yet another object of the present invention to provide a packaging material which gives reliable seals even when contaminated. Especially in the packaging of meat it frequently occurs that the sealing areas are contaminated with grease or blood, both of which tend to impair the sealing between hitherto used sealing layers.

Finally and most importantly it is an object of this invention to provide a material combining the above advantages, i.e. improved shrinkability, increased maximum shrink temperature, good cold seal strength and sealability through contamination.

It has been found that the above-mentioned objects are achieved by the present invention which is directed to a thermoplastic multi-layer packaging film comprising at least an outer polymer layer, an inner heat sealing layer and optionally an oxygen barrier layer between said inner and said outer layer, and which is characterized in that the heat sealing layer comprises a copolymer of ethylene and x to y% by weight, based on the copolymer, of an $\alpha$-olefin with 4 to 8 carbon atoms, whereby $x=0.5n_C+8$ and $y=1.25n_C+15$ with $n_C$ being the number of carbon atoms in the $\alpha$-olefin, said copolymer having a density of less than 920 kg/m$^3$.

Preferably the heat sealing layer comprises a copolymer of ethylene and 12 to 20% by weight, based on the copolymer, of an $\alpha$-olefin with 4 to 8 carbon atoms.

It has surprisingly been found that both the heat shrink properties and the cold seal strength of the laminated packaging film depend on the comonomer content of the ethylene copolymer used as the sealing layer. In order to achieve optimal results the comonomer content must increase when going from the C$_4$-$\alpha$-olefin (butene(1)) to the C$_8$-$\alpha$-olefin (octene(1)). It is particularly surprising that the films of the present invention exhibit improved shrink properties both in irradiated (cross-linked) and non-irradiated condition and that these properties as well as the seal strength are a function of the comonomer content of the linear low and very low density "polyethylene".

When using a copolymer of ethylene and butene (1) the comonomer content should be between 10 and 20% by weight, based on the copolymer. Such copolymers have a density of less than 915 kg/m$^3$. When employing a copolymer of ethylene and octene (1) the comonomer content should preferably be increased to between 12 and 25% by weight, based on the copolymer. Such copolymers have a density of less than 920 kg/m$^3$.

According to the invention it is also possible to blend the ethylene/$\alpha$-olefin copolymer with up to 50% by weight, based on the sealing layer composition, of a polymer which is compatible with said ethylene/$\alpha$-olefin copolymer. Such further polymer may preferably be selected from the group comprising linear low density polyethylene (LLDPE) with a density above 920 kg/m$^3$, linear high density polyethylene (LHDPE), low density polyethylene (LDPE), ethylene vinyl acetate (EVA), acid modified EVA, polypropylene, ethylene/propylene copolymers, ionomeric polymers and ethylene/alkylacrylate copolymers wherein the alkyl moiety has 1 to 8 C atoms, in particular ethylenemethylacrylate (EMA), ethylene-ethylacrylate (EEA) and ethylene-butylacrylate (EBA).

The ethylene/alkylacrylate copolymer which can be blended with the ethylene/α-olefin in the heat sealing layer can comprise 3 to 30% by weight of alkylacrylate.

According to one embodiment of the invention the ethylene copolymer forming the sealing layer may be cross-linked by irradiation in order to improve its shrink characteristics and mechanical properties. However, such cross-linking is not necessary since a very satisfactory packaging film is also obtained without irradiation. If polyvinylidene chloride is used as core layer providing an oxygen barrier the irradiation should take place prior to the lamination of the core layer to the sealing layer since PVDC may suffer when exposed to high energy irradiation. The entire multi-layer film may be irradiated if the PVDC core layer is substituted by a core layer of partly hydrolyzed ethylene vinyl-acetate copolymer (EVOH). PVDC and EVOH are the preferred core layers since they show outstanding oxygen barrier properties.

The films are normally oriented in longitudinal and transversal direction to obtain the desired shrink properties. If a tubular film is produced by extrusion the orientation may be effected using the known air bubble method and further stretching the film by pulling. Alternatively, orientation may be achieved by deep drawing of a planar film.

The outer layer of the multi-layer packaging film of the invention may be of the same ethylene copolymer as the sealing layer, i.e. an ethylene/α-olefin copolymer comprising 10 to 25% by weight, based on the copolymer, of an α-olefin with 4 to 8 carbon atoms, said copolymer having a density of less than 920 kg/m$^3$ ethylene vinyl acetate and polyamides, and ionomeric resins. It may frequently be of advantage if an adhesive layer and/or an adhesion promoting layer is interposed between said other layers.

If bags are made from the film material the film will normally be folded so that the fold forms the bottom of the bag whereafter both sides are sealed so that the side seals close both sides of the bag. Alternatively a bag may be formed from a tubular film in that the bottom of the bag is formed by a transverse seal across the flattened tube and the mouth is formed by severing the tube at a pre-selected distance from said transverse seal. Pouches can be obtained by sealing two film sheets at three edges.

The invention will be further illustrated by reference to the following examples without being limited thereto.

The following test methods were used to investigate the properties of the packaging films and to compare them with other materials.

A. VARIABLE PRESSURE HOT BURST TEST (VPHB)

This is a test to determine the seal quality of shrinkable materials at different temperatures. The approach with this test is to immerse total seal areas into hot water and after a predetermined dwell time, the pressure inside the bag is increased at a constant rate of approx. 25,4 mm of water per second until the seal fails.

The mm of water pressure, at the level at which the seal fails, are recorded, and there are minimum specifications expressed in mm for each bag width. The highest is the number, the better is the seal quality at that temperature.

B. PERCENT SHRINK

The percent shrink is measured immersing for a couple of seconds in hot water a specimen and measuring the percent of retraction, both in the longitudinal and transversal direction. The highest is the percent of shrink, the better is the performance of the material in terms of package presentation.

In practice, the maximum achievable percent of shrink is that measured at the temperature at which the material meets the minimum VPHB requirements expressed in mm of water pressure (see point A). To predict the shrink behaviour it is therefore useful to plot in the same diagram the % of shrink and the VPHB as a function of the temperature.

C. COLD SEAL STRENGTH

The cold seal strength represents the seal quality at room temperature and predicts the seal performance when the bag is loaded with a product, either manually or by means of automatic loaders, which operate with a pusher, which pushes the product into the bag. The cold seal strength is measured with a modified pusher of a commercial loader, equipped with a system to record the pressure necessary to open the bottom seal. The head of the pusher operates on a 6 cm length of seal and the cold seal strength is expressed in kg/6 cm. The maximum pressure recordable with this systems is 40 kg/6 cm.

The reported results are the average of 10 measurements.

The following raw materials were used in the examples:

| ABBREVIATION | RAW MATERIALS COMPOSITION | MELTING POINT | DENSITY (g/cm$^3$) |
|---|---|---|---|
| E/15% B | ethylene-butene copolym., 15% butene | 118° C. | 0.906 |
| E/8% B | ethylene-butene copolym., 8% butene | 121.5° C. | 0.918 |
| E/6% VA | ethylene-vinylacetate copolym., 6% VA | 105° C. | 0.926 |
| E/9% VA | ethylene-vinylacetate cop., 9% VA | 96° C. | 0.929 |
| E/14% VA | ethylene-vinylacetate copolym., 14% VA | 90° C. | 0.932 |
| E/18% VA | ethylene-vinylacetate cop. 18% VA | 91° C. | 0.940 |
| Ionomer (Na) | Ionomeric resin (Na salt) | 90–92° C. | 0.940 |
| E/19% O | ethylene-octene copolym., 19% octene | 124° C. | 0.911 |
| E/13% O | ethylene-octene copolym., 13% octene | 124° C. | 0.915 |
| E/10.5% O | ethylene-octene copolym., 10.5% octene | 123° C. | 0.920 |
| Acid modif. EVA | acid modified Ethylene—Vinylacetate | (55° C.) | 0.948 |
| PA | Polyamide (Nylon 6,12 copolymer) | 140–147° C. | 1.06 |
| EMA (20% MA) | ethylene-methylacrylate copolym., 20% MA | 85–90° C. | 0.942 |

-continued

| ABBREVIATION | RAW MATERIALS COMPOSITION | MELTING POINT | DENSITY (g/cm³) |
|---|---|---|---|
| EBA (7% BA) | ethylene-butylacrylate copolym., 7% BA | 98–108° C. | 0.923 |
| P/4.5% E | propylene-ethylene copolym., 4.5% E | 135° C. | 0.900 |

COMPARATIVE EXAMPLES 1 TO 4 AND

EXAMPLES 1 TO 3

Multi-layer packaging films of the composition summarized below in table I were prepared in the following manner. The first two layers A and B were coextruded through a conventional tubular extruder to form a tube. After leaving the die the substrate was cooled and flattened. It was then sent through an irradiation vault where it was irradiated by high energy electrons to a dosage of about 4.5 MR. Depending on the characteristics desired this dosage could vary from 2 to 20 MR. After leaving the irradiation vault the substrate was again inflated and sent through a first tubular extrusion coating die where it received a coating of vinylidene chloride copolymer. Thereafter the still inflated and now triple-walled film passed through a second tubular extrusion coating die where it received a layer of ethylene-vinyl acetate copolymer. After the final coating the film was cooled, collapsed and rolled-up. This tape was subsequently unrolled, fed through a bath of hot water, held at a temperature of about 80° to 98° C., and as it left the water it was inflated and blown into thin tubing with a total wall thickness of about 59 microns. This so-called "trapped bubble" technique is well known in the art. The film was then rapidly cooled to set the orientation and then rolled up for further processing.

The polyvinylidene chloride and the ethylene-vinylacetate copolymer can alternatively be coated onto the substrate using a two-ply coextrusion die.

The test results are summarized in the following table II.

TABLE 1

| | A | | B | | D | | F | |
|---|---|---|---|---|---|---|---|---|
| Example No. | sealing layer | μm | core layer | μm | barrier layer | μm | outer layer | μm |
| Comp. 1 | E/9% VA | 37 | — | | PVDC | B | E/9% VA | 14 |
| Comp. 2 | Ionomer (Na) | 15 | E/9% VA | 22 | PVDC | 8 | E/9% VA | 14 |
| Comp. 3 | E/8% B | 15 | E/9% VA | 22 | PVDC | 8 | E/9% VA | 14 |
| Comp. 4 | E/10.5% O | 15 | E/9% VA | 22 | PVDC | 8 | E/9% VA | 14 |
| 1 | E/15% B | 15 | E/9% VA | 22 | PVDC | 8 | E/9% VA | 14 |
| 2 | E/13% O | 15 | E/9% VA | 22 | PVDC | 8 | E/9% VA | 14 |
| 3 | E/19% O | 15 | E/9% VA | 22 | PVDC | 8 | E/9% VA | 14 |

TABLE II

| | Example | | | | | | | | | | | | | |
|---|---|---|---|---|---|---|---|---|---|---|---|---|---|---|
| | Comparison 1 | | Comparison 2 | | Comparison 3 | | Comparison 4 | | Example 1 | | Example 2 | | Example 3 | |
| Temperatures | VPHB mm H₂O | Shrink % $\frac{L+T}{2}$ | VPHB mm H₂O | Shrink % $\frac{L+T}{2}$ | VPHB mm H₂O | Shrink % $\frac{L+T}{2}$ | VPHB mm H₂O | Shrink % $\frac{L+T}{2}$ | VPHB mm H₂O | Shrink % $\frac{L+T}{2}$ | VPHB mm H₂O | Shrink % $\frac{L+T}{2}$ | VPHB mm H₂O | Shrink % $\frac{L+T}{2}$ |
| 60° C. | | | | 4 | | 2 | | 2 | | 3 | | 2 | | 4 |
| 70° C. | | | | 11 | | 6 | | 7 | | 10 | | 7 | | 9 |
| 80° C. | 663 | 21 | 856 | 25 | 855 | 12 | 930 | 14 | 1040 | 27 | 1051 | 16 | 1074 | 25 |
| 85° C. | 652 | 30 | 782 | | 795 | | 841 | | 940 | | 928 | | 990 | |
| 90° C. | 520 | 41 | 608 | 45 | 644 | 24 | 695 | 28 | 783 | 48 | 745 | 33 | 802 | 49 |
| 95° C. | 318 | 57 | 438 | | 540 | | 552 | | 647 | | 558 | | 621 | |
| 100° C. | | | 268 | 63 | 420 | 42 | 432 | 49 | 398 | 64 | 429 | 53 | 363 | 67 |
| COLD SEAL STRENGTH (kg/6 cm) | 24,5 (10% no. breakage) | | 15,8 | | 16,1 | | 17,3 | | 22,5 | | 19,4 | | 23,5 | |

When comparing the results it should be borne in mind that the shrink temperature should not exceed a value at which the hot-burst pressure drops below 650 mm/H₂O. For some food products the maximum shrink temperature may be more limited but a higher hot-burst will then give additional safety. It is clear from the data in table II that comparison 1 gives good cold seal strength but the hot seal strength and the percent shrink leave something to be desired. Further, this material results in poor seal strength through contamination like grease or blood. Comparison 2 shows improved shrink characteristics but the cold seal strength is considerably lower and this material cannot be sealed reliably through blood contamination.

Examples 1, 2 and 3 show that excellent shrink characteristics and a very good seal strength both at room temperature and at elevated temperatures are being obtained. It has further been found that the seal strength is not significantly affected by contamination like grease or blood. Comparisons 3 and 4 show that a very significant decrease both in seal strength and percent shrink occur when the comonomer content in the ethylene α-olefin copolymer drops below a certain level, i.e. the minimum comonomer content is an essential feature if the combination of desired properties is to be achieved.

COMPARATIVE EXAMPLES 5 AND 6, EXAMPLES 4 TO 10

Multi-layer packaging films of the composition summarized in the following table III were produced by conventional techniques, i.e. by coextruding a tubular film of layers A to F and subsequent stretching and orientation, e.g. in a blown-up bubble, so as to obtain a heat shrinkable film. No irradiation was employed in this case. The test results obtained are tabulated in the following table IV.

which are always encountered in the packaging of meat products. Further, the non-irradiated structures show the same effect, namely a strong dependency of the shrink and seal characteristics on the comonomer content of the ethylene/α-olefin copolymer.

The embodiments of the invention in which an exclusive property or privilege is claimed are defined as follows:

1. A multi-layer thermoplastic packaging film having improved heat shrink and cold seal properties, said film comprising:

TABLE III

| Example No. | A sealing layer | μm | B core layer | μm | C adhesion promotor | μm | D barrier layer | μm | E adhesion promotor | μm | F outer layer | μm |
|---|---|---|---|---|---|---|---|---|---|---|---|---|
| Comp. 5 | Ionomer (Na) | 25 | E/18% VA E/14% VA | 9 + 43 | acid modif. EVA | 6 | PVDC | 8 | acid modif. EVA | 6 | PA | 23 |
| Comp. 6 | E/8% B | 25 | E/18% VA E/14% VA | 9 + 43 | acid modif. EVA | 6 | PVDC | 8 | acid modif. EVA | 6 | PA | 23 |
| 4 | E/15% B | 25 | E/18% VA E/14% VA | 9 + 43 | acid modif. EVA | 6 | PVDC | 8 | acid modif. EVA | 6 | PA | 23 |
| 5 | E/13% O | 25 | E/18% VA E/14% VA | 9 + 43 | acid modif. EVA | 6 | PVDC | 8 | acid modif. EVA | 6 | PA | 23 |
| 6 | E/19% O | 25 | E/18% VA E/14% VA | 9 + 43 | acid modif. EVA | 6 | PVDC | 8 | acid modif. EVA | 6 | PA | 23 |
| 7 | 75% E/13% O + 25% EBA | 25 | E/18% VA E/14% VA | 9 + 43 | acid modif. EVA | 6 | PVDC | 8 | acid modif. EVA | 6 | PA | 23 |
| 8 | 90% E/13% O + 10% acid modif. EVA | 25 | E/18% VA E/14% VA | 9 + 43 | acid modif. EVA | 6 | PVDC | 8 | acid modif. EVA | 6 | PA | 23 |
| 9 | 50% E/13% O + 50% E/8% VA | 25 | E/18% VA E/14% VA | 9 + 43 | acid modif. EVA | 6 | PVDC | 8 | acid modif. EVA | 6 | PA | 23 |
| 10 | 50% E/15% B + 50% P/4,5% E | 25 | E/18% VA E/14% VA | 9 + 43 | acid modif. EVA | 6 | PVDC | 8 | acid modif. EVA | 6 | PA | 23 |

TABLE IV

| | Comparison 5 | | Comparison 6 | | Example 4 | | Example 5 | | Example 6 | |
|---|---|---|---|---|---|---|---|---|---|---|
| Temperatures | VPHB mm H$_2$O | Shrink % L + T / 2 | VPHB mm H$_2$O | Shrink % L + T / 2 | VPHB mm H$_2$O | Shrink % L + T / 2 | VPHB mm H$_2$O | Shrink % L + T / 2 | VPHB mm H$_2$O | Shrink % L + T / 2 |
| 60° C. | | 15 | | 4,5 | | 13,5 | | 5 | | 9 |
| 70° C. | | 25 | | 9,5 | | 21,5 | | 11 | | 19,5 |
| 80° C. | 993 | 37 | 951 | 15,6 | 1084 | 33,5 | 1043 | 19 | 1007 | 33 |
| 85° C. | 877 | | | | | | 892 | | 753 | |
| 90° C. | 617 | 43 | 857 | 30,6 | 835 | 45,0 | 710 | 36 | 560 | 43 |
| 95° C. | 381 | | | | | | 534 | | 431 | |
| 100° C. | 319 | 46 | 599 | 42,0 | 546 | 55,0 | 436 | 51 | 338 | 51 |
| COLD SEAL STRENGTH (kg/6 cm) | 17,6 | | 25,6 | | 32,7 (70% no. breakage) | | 29,6 | | 28 | |

| | Example 7 | | Example 8 | | Example 9 | | Example 10 | |
|---|---|---|---|---|---|---|---|---|
| Temperatures | Shrink % VPHB mm H$_2$O | L + T / 2 | Shrink % VPHB mm H$_2$O | L + T / 2 | Shrink % VPHB mm H$_2$O | L + T / 2 | Shrink % VPHB mm H$_2$O | L + T / 2 |
| 60° C. | | 5 | | 6 | | 10 | | 4 |
| 70° C. | | 12 | | 13 | | 16 | | 10 |
| 80° C. | 1020 | 18 | 980 | 20 | 940 | 20 | 1150 | 18 |
| 85° C. | 850 | | 780 | | 720 | | 810 | |
| 90° C. | 700 | 35 | 670 | 35 | 610 | 34 | 700 | 34 |
| 95° C. | 525 | | 510 | | 470 | | 560 | |
| 100° C. | 410 | 52 | 430 | 48 | 320 | 52 | 490 | 44 |
| COLD SEAL STRENGTH (kg/6 cm) | 32,0 | | 34 | | 32 | | 25 | |

The results are essentially similar to those obtained with the irradiated material. Only the films of the present invention combine excellent shrink characteristics with outstanding cold and hot seal strength. In addition thereto they may be sealed without impairing the seal strength through contamination like grease or blood (a) a first surface layer which is a heat sealing surface, said layer comprising:
 (1) a copolymer of ethylene and an alpha-olefin having 4 to 8 carbon atoms per molecule; and, (2) said copolymer comprising 90% to 75% ethylene and 10% to 25% alpha-olefin having 4 to 8 carbon molecules and a density of less than 915 kg/m$^3$;

(b) a second surface layer, said layer comprising a polymer selected from the group consisting of amide polymers, ethylene/vinyl-acetate copolymers, the copolymer of the first layer, and ionomers;

(c) a first core layer comprising an ethylene/vinyl-acetate copolymer;

(d) a second core or barrier layer comprising a polymer selected from the group consisting of copolymers of vinylidene chloride and hydrolyzed copolymers of ethylene/vinyl-acetate;

(e) said core layers being internal film layers positioned between said first and second surface layers;

(f) at least one adhesive layer to promote adhesion of the barrier layer to another layer; and (g) said film comprising at least five layers.

2. The film of claim 1 wherein the first surface layer is cross-linked.

3. The film of claim 1 wherein the first surface layer comprises a blend of the copolymer defined in (a) (1) and (2) with a copolymer selected from the group consisting of copolymers of ethylene/vinyl-acetate and copolymers of ethylene/butyl-acrylate.

4. The film of claim 1 wherein the second core or barrier layer comprises a vinylidene chloride copolymer and the second surface layer comprises a polyamide.

5. A bag formed from the film of claim 1.

* * * * *

UNITED STATES PATENT AND TRADEMARK OFFICE
CERTIFICATE OF CORRECTION

PATENT NO.   :   4,801,486
DATED        :   January 31, 1989
INVENTOR(S)  :   Richard S. Williams and Cesare Quacquarella It is certified that error appears in the above-identified patent and that said Letters Patent is hereby corrected as shown below:

On the cover page of the patent, please add the two Italian priorities. These are:

COUNTRY: ITALY &  
Serial No.: 22305 A/85  
Filed: September 30, 1985

COUNTRY: ITALY  
Serial No.: 20457 A/86  
Filed: May 16, 1986

Signed and Sealed this

Fifth Day of March, 1991

Attest:

HARRY F. MANBECK, JR.

Attesting Officer

Commissioner of Patents and Trademarks